United States Patent

Yamashita

[11] Patent Number: 5,565,629
[45] Date of Patent: Oct. 15, 1996

[54] SEMICONDUCTOR-TYPE PRESSURE SENSOR WITH ISOLATION DIAPHRAGM WITH FLAT PORTION BETWEEN CORRUGATIONS

[75] Inventor: Yasuhiro Yamashita, Aichi, Japan

[73] Assignee: Nippondenso Co., Ltd., Japan

[21] Appl. No.: 284,583

[22] PCT Filed: Dec. 6, 1993

[86] PCT No.: PCT/JP93/01771

§ 371 Date: Aug. 10, 1994

§ 102(e) Date: Aug. 10, 1994

[87] PCT Pub. No.: WO94/14042

PCT Pub. Date: Jun. 23, 1994

[30] Foreign Application Priority Data

Dec. 11, 1992 [JP] Japan .................................. 4-331414

[51] Int. Cl.$^6$ .................................. G01L 7/00; G01L 7/08
[52] U.S. Cl. .................................................. 73/706; 73/715
[58] Field of Search ........................ 73/706, 708, 715–728

[56] References Cited

U.S. PATENT DOCUMENTS

| | | | |
|---|---|---|---|
| 2,968,943 | 1/1961 | Statham | 73/726 X |
| 4,303,903 | 12/1981 | Matsuoka et al. . | |
| 4,507,972 | 4/1985 | Morita . | |
| 4,527,434 | 7/1985 | White | 73/720 X |
| 4,768,382 | 9/1988 | Varrese . | |
| 5,000,047 | 3/1991 | Kato et al. . | |
| 5,095,755 | 3/1992 | Peterson . | |
| 5,161,415 | 11/1992 | Kodama et al. . | |
| 5,212,989 | 5/1993 | Kodama et al. . | |

FOREIGN PATENT DOCUMENTS

| | | |
|---|---|---|
| 383974 | 8/1990 | European Pat. Off. . |
| 57-33334 | 2/1982 | Japan . |
| 58-168930 | 10/1983 | Japan . |
| 60-49441 | 4/1985 | Japan . |
| 60-104745 | 7/1985 | Japan . |
| 61-203337 | 12/1986 | Japan . |
| 62-8470 | 2/1987 | Japan . |
| 63-43379 | 2/1988 | Japan . |
| 1248033 | 10/1989 | Japan . |
| 2206738 | 8/1990 | Japan . |
| 4204130 | 7/1991 | Japan . |
| 3225241 | 10/1991 | Japan . |
| 4-25735 | 1/1992 | Japan . |
| 4166735 | 6/1992 | Japan . |

*Primary Examiner*—Richard Chilcot
*Assistant Examiner*—Joseph L. Felber
*Attorney, Agent, or Firm*—Cushman Darby & Cushman, LLP

[57] ABSTRACT

The present invention aims to provide a semiconductor type pressure sensor capable of preventing an occurrence of a thermal output value, thereby improving a linearity of the output with respect to a change in the temperature. The sensor includes housing 8 provided with a pressure detecting chamber 3, a pressure receiving diaphragm 2 arranged to be adjacent the liquid confined in the pressure detecting chamber 3, and a pressure detecting element 4 arranged in the pressure detecting chamber 3 so as to receive the pressure of the liquid. The diaphragm 2 includes at a location adjacent its fixed end a corrugation 2c, which is made of a pair of convex and concave portions 2a and 2b, and a flat portion 2d. A ratio of the distance between the convex and concave portions 2a and 2b, and the radius R of the diaphragm 2, and a ratio of the flat portion 2d and the radius R of the diaphragm 2 are set to respective desired ranges.

6 Claims, 6 Drawing Sheets

SEMICONDUCTOR-TYPE PRESSURE SENSOR WITH ISOLATION DIAPHRAGM WITH FLAT PORTION BETWEEN CORRUGATIONS

TECHNICAL FIELD

The present invention relates to a semiconductor-type pressure sensor of the confined-liquid-type wherein a liquid is confined in a pressure detecting chamber which is closed by diaphragm and a semiconductor pressure detecting element is arranged in the pressure detecting chamber.

BACKGROUND ART

In a prior art, as a pressure sensor for detecting pressure in a medium of relatively high pressure or temperature, as in an internal combustion engine, use is made of a pressure sensor of a liquid confined type wherein a semiconductor pressure detecting element such as a piezo-electric type resistor element, is sealingly stored in a liquid such a silicon oil confined by a diaphragm.

In this kind of the liquid confined type pressure sensor, a change in an environment temperature causes the volume of the confined inside liquid to change. Thus, the pressure of the liquid varies in accordance with the pressure of the liquid. The pressure sensor issues an output signal, which is, also, obtained even when no pressure to be detected exists, due to the fact that a thermal output (outlet value due to the heat) is generated by the existence of the internal pressure. A value of the error has a negative value when the temperature change is low, and has a positive value when the temperature change is high. Furthermore, such an error does not change linearly with respect to a change in the temperature, and is difficult to correct by a usual temperature correction circuit. Thus, it is required that such a non-linearity is reduced as much as possible.

A Japanese Patent Publication No. 4-204130 discloses, for example, a diaphragm defining, at a location adjacent its fixed end, a pair of corrugations constructed as a succession of convex and concave portions, which pair of corrugations function to absorb the change in the inner pressure.

However, such a succession of the convex and concave portions in the prior art device is defective in that they generate the following problems.

Figure 9:
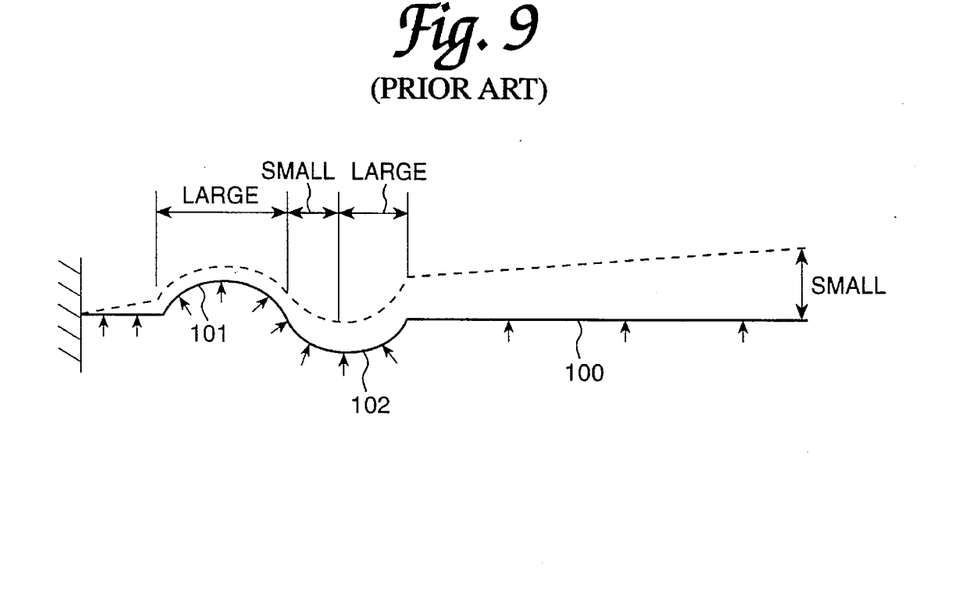
FIG. 9 is an illustration for illustrating how the prior art operates.

As shown in FIG. 9, a thermal expansion of the silicon oil due to its temperature increase causes the inner pressure to be changed, thereby obtaining a deformation in a diaphragm 100. In this case, a curvature of the convex portion 101 is as a whole increased, while a curvature of the concave portion 102 is reduced at its half section located adjacent the convex portion 101, i.e., at its left half section in the drawing. Namely, due to a direct influence of the increase in the curvature of the convex portion 101 to the left half portion of the concave portion 102, this left half section of the concave portion 102 is urged so that its curvature is reduced. Due to such a reduction in the curvature of the left half section of the concave portion 102, a sufficiently large amount of the displacement of the diaphragm can not be obtained. Namely, a change in the inner pressure caused by the temperature change can not be absorbed, resulting in a problem that a desired linearity of the temperature characteristic can not be obtained.

The present invention is conceived in view of the above difficulty, and aims to provide a semiconductor type pressure sensor capable of preventing an output being generated due to a change in temperature, thereby improving the linearity of the output with respect to a change in temperature.

DISCLOSURE OF THE INVENTION

In order to attain the above object, according to the present invention, a semiconductor type pressure sensor is provided, which comprises a housing for providing therein a pressure detection chamber, a pressure receiving diaphragm adjoining a liquid confined in said pressure detection chamber, and a pressure detection element arranged to receive the pressure of the liquid in the pressure detection chamber, said diaphragm having, at a location adjacent its fixed end, only a pair of corrugations comprising convex and concave portions, and a flat portion of a predetermined length arranged between said convex and concave portions.

According to the semiconductor pressure sensor thus constructed, a pressure of a fluid on the diaphragm causes the diaphragm to be deformed, so that the pressure detecting element is subjected to the pressure via the liquid in the pressure detecting chamber, so that an electric signal in accordance with the pressure, as a measured pressure value, is produced.

When the temperature or the fluid and the pressure sensor changes, the liquid in the pressure detecting chamber expands or contracts. When a resultant change of the pressure occurs in the chamber (a positive or a negative pressure), a corrugation comprising a pair of convex and concave portions provided in the diaphragm allows the latter to be similarly bent at both of its inner and outer sides, thereby causing the diaphragm to be subjected to a balanced deformation.

When the liquid in the pressure detecting chamber expands or contracts, the resultant change in the inside pressure generates a force which is concentrated at the fixed end. According to the present invention, since a corrugation having only a pair of convex and concave portions exists on the diaphragm at a location adjacent the fixed end thereof, the expansion of the fluid in the pressure detecting chamber, caused, for example, by an increase in temperature, allows the diaphragm to expand and deform outwardly over its substantial area, thereby allowing the volume of the pressure detecting chamber to be sufficiently increased. As a result, the change in the inside pressure caused by the temperature change is minimized, thereby minimizing an occurrence of a thermal output (thermal output value).

Figure 10:
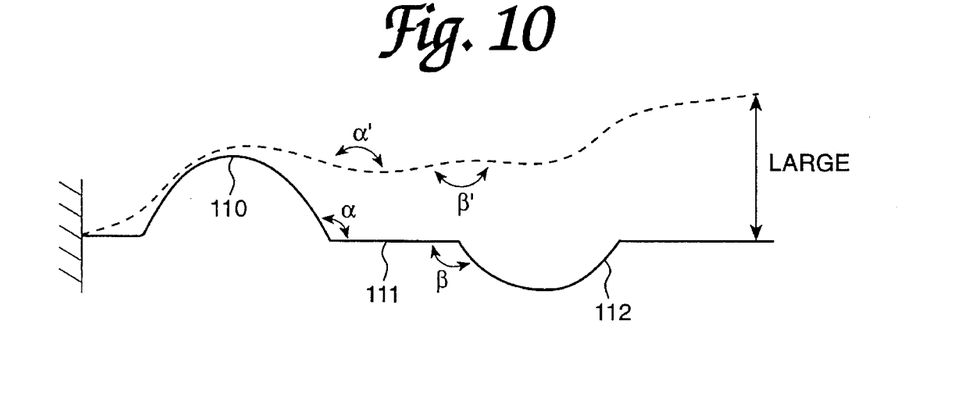
FIG. 10 is an illustration for illustrating how the present invention operates.

Furthermore, according to the present invention, since the convex and conveyed portions are spaced apart by a predetermined distance by means of the flat portion, the latter portion functions as a buffer means between the corrugated portions. In more detail, as shown in FIG. 10, when the diaphragm is subjected to a deformation, an angle α formed between the convex and flat portions 110 and 111 and angle β formed between the concave and flat portions 112 and 111 are, both, increased to angles α' and β'. This means that, irrespective of a deformation of the diaphragm by means of a change of the inside pressure, both of the curvature of the convex portion 110 and the curvature of the concave portion 112 are increased. As a result, a sufficiently large displacement of the diaphragm is obtained which can absorb the change in the inside pressure caused by the change in the temperature.

In short, according to the present invention, a remarkable advantage is obtained in that the generation of an output value by a thermal effect is prevented, thereby reducing the non-linearity of the output with respect to a change in temperature.

BEST MODE FOR PRACTICING THE INVENTION

Now, an embodiment of the present invention will be explained with reference to drawings.

Figure 1:
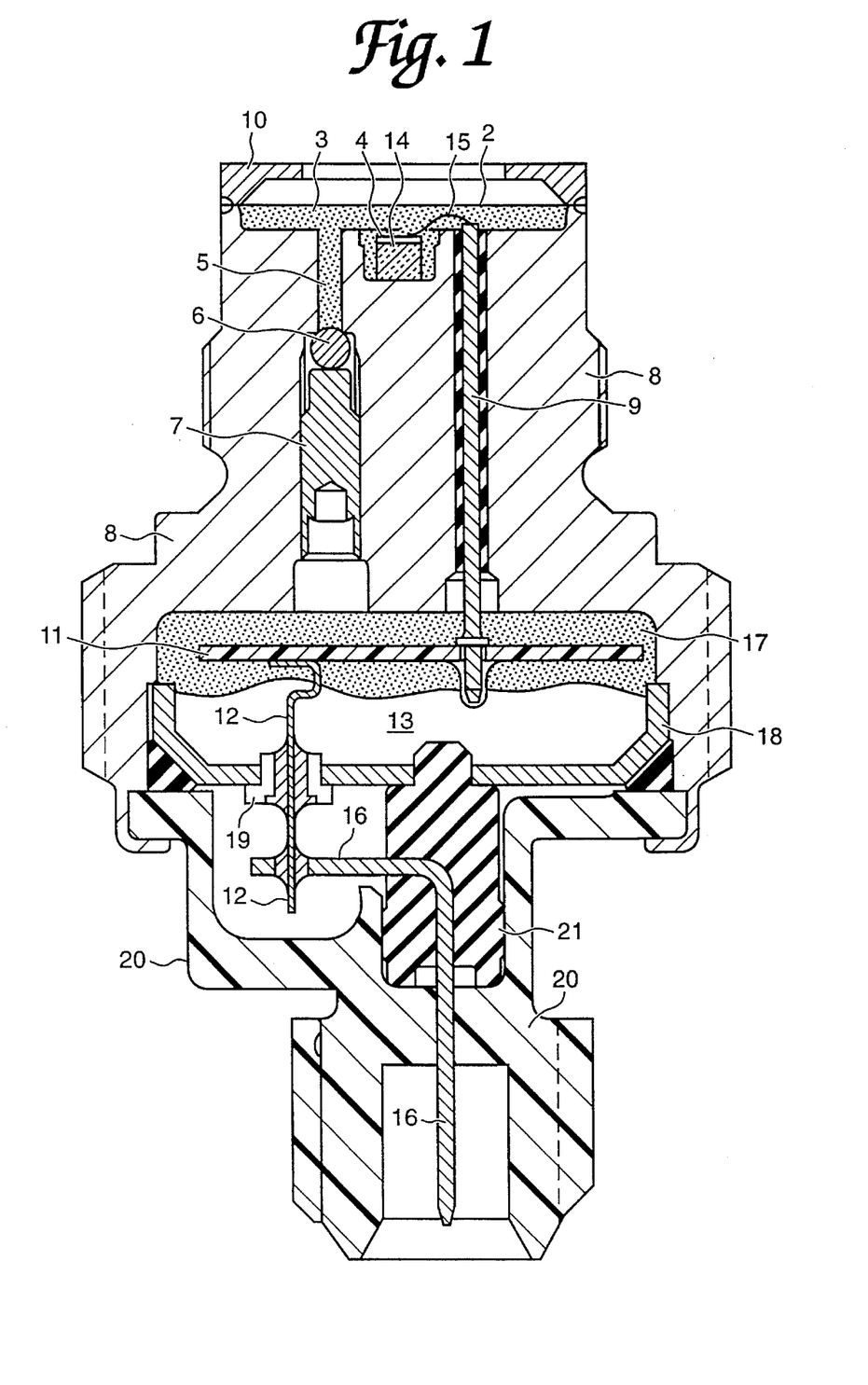
FIG. 1 is a cross sectional view of a semiconductor pressure sensor illustrating an embodiment of the present invention.

FIG. 1 shows a cross sectional view of a semiconductor type pressure sensor having a sensor body including a housing 8 constructed from a material such as S15C. The housing 8 has an outer periphery defining a screw thread for its mounting. The housing 8 defines, at its top portion, a recess for creating a pressure detecting chamber 3 having an upper opening which is sealingly closed by a diaphragm 2.

Figure 2:
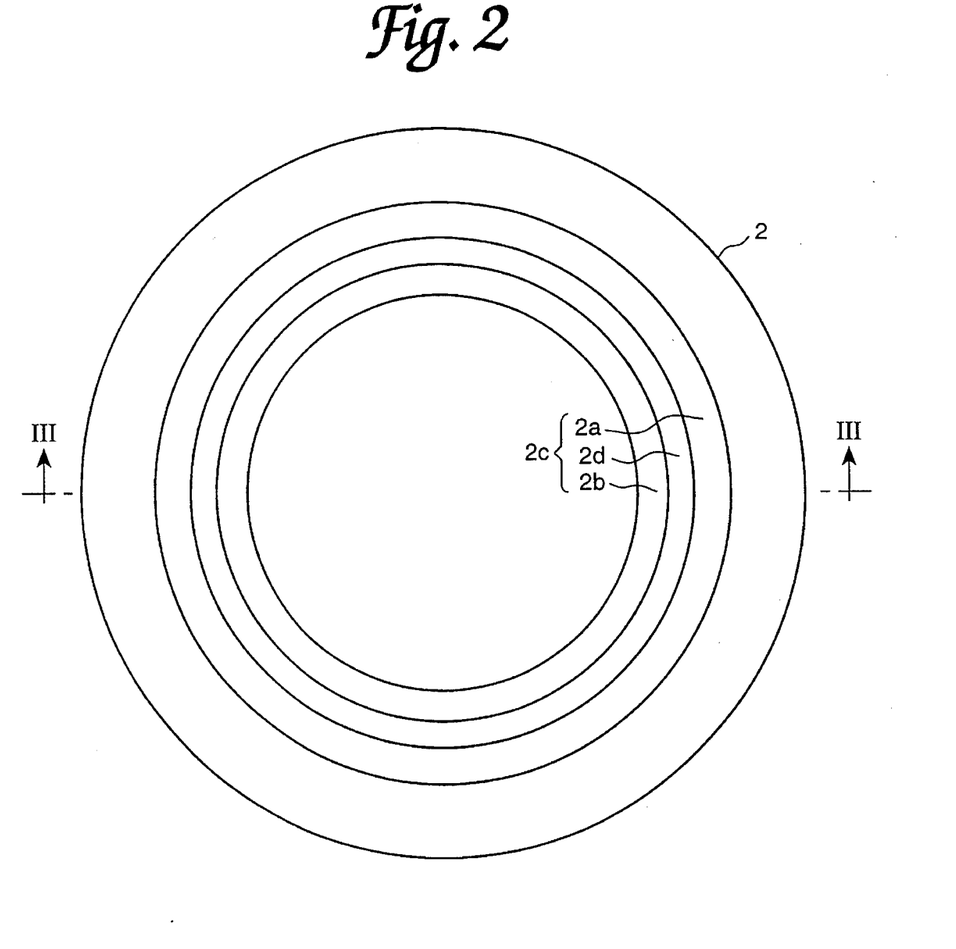
FIG. 2 is an enlarged plan view of a diaphragm.

The diaphragm 2 is formed from a thin metal plate made from a material such as SUS316L, and has an outer portion, which is sandwiched between an annular member 10 and an upper portion of the housing 8. A welding is done for fixation of the diaphragm at its outer periphery. Furthermore, the diaphragm 2 has, as shown in FIG. 2, at its outer peripheral portion, a corrugation 2c, extending in a circle, which is comprised of a pair of convex portion 2a (constructed by upwardly projecting the diaphragm at its upper side, while upwardly recessing it at its lower side) and a concave portion 2b (constructed by downwardly projecting the diaphragm at its lower side, while downwardly recessing the it at its upper side). A flat portion 2d is arranged between the convex and concave portions 2a and 2b. Details of these convex and concave portions 2a and 2b and flat portion 2d, in the corrugation 2c, will be explained later.

Furthermore, the pressure detecting chamber 3 forms, at its central portion, a recess, in which a pressure detection member 4 is arranged, and a fixation of the latter is done by means of a base 14 made of a glass material. The pressure detecting element 4 is constructed of piezo-electric type resistor elements which are connected in a bridge circuit, so that an electric signal is generated in accordance with the pressure on the pressure detecting surface of the element.

The housing 8 forms, at its bottom portion, a recess 13, which is in communication with the pressure detecting chamber 3 via a plurality of longitudinal holes, through which electrically conductive pins 9 are inserted. The pins 9 are around their outer periphery, sealed by a glass material. Reference numeral 5 indicates a liquid charging longitudinal hole. Namely, a liquid, such as a silicon oil, is introduced into the pressure detecting chamber 3 by way of the longitudinal hole 5, which is sealingly closed by means of a steel ball 6 as well as a screw member 7. Into the pressure detection chamber 3, a plate made of a material such as ceramic or phosphorous bronze can be inserted, which is effective for reducing the amount of liquid to be charged. The pressure detecting element 4 is, at its terminals, connected, by wire bonding, to the tip ends of electrical conductive pins 9 via wires 15. In the recess at the lower portion of the housing 8, a circuit board 11 including a circuit such as an amplifier is stored. The circuit board has predetermined holes to which corresponding pins 9 are inserted and soldered. Connected to the circuit board 11 is a lead wire element 12 extending downwardly. The circuit board 11 is itself protected by means of solidified silicon gel 17 in the recess 13.

The recess 13 is at its bottom end closed by means of a cover 18 made of a metal material. The lead wire element 12 has a lower end passed through a through type condenser 19 mounted to the cover 18 and soldered thereto, and is projected downwardly.

A terminal pin 16 made of a material such as brass is soldered to the tip end of the lead wire element 12. A pin holding member 21 made of a material such as fluoric rubber is insert molded with the terminal pin 16 in such a manner that the latter is partly held by the pin holding member 21. The pin holding member 21 has a tip end portion which is fitted and fixed to a hole formed in the cover 18 at its substantially center portion.

A connector member 20 is provided so that it encircles the cover 18 and the terminal pin 16 and is connected to the housing 8 at its bottom end by crimping. The connector member 20 is obtained by molding to a desired shape from a material such as poly-butyleneterephthalate resin, so that the end of the terminal pin 16 is exposed outwardly at a location of the connected member 20 for insertion.

Figure 3:
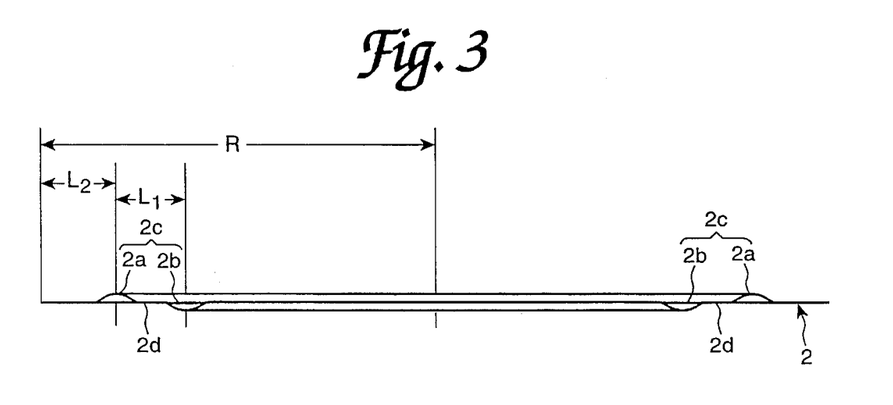
FIG. 3 is a cross sectional view taken along a line III—III in FIG. 2.
Figure 4:
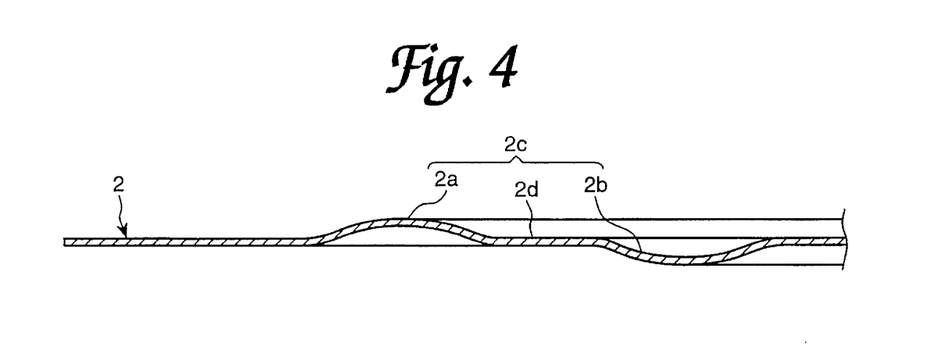
FIG. 4 is an enlarged cross sectional view of a corrugated portion 2c.

As shown in FIGS. 2 to 4, the corrugation 2c is constructed of a pair of convex and concave portions 2a and 2b, and a flat portion 2d thereby balancing the positive and negative pressures in the pressure detecting chamber 3 when a large temperature change is generated.

Figure 5:
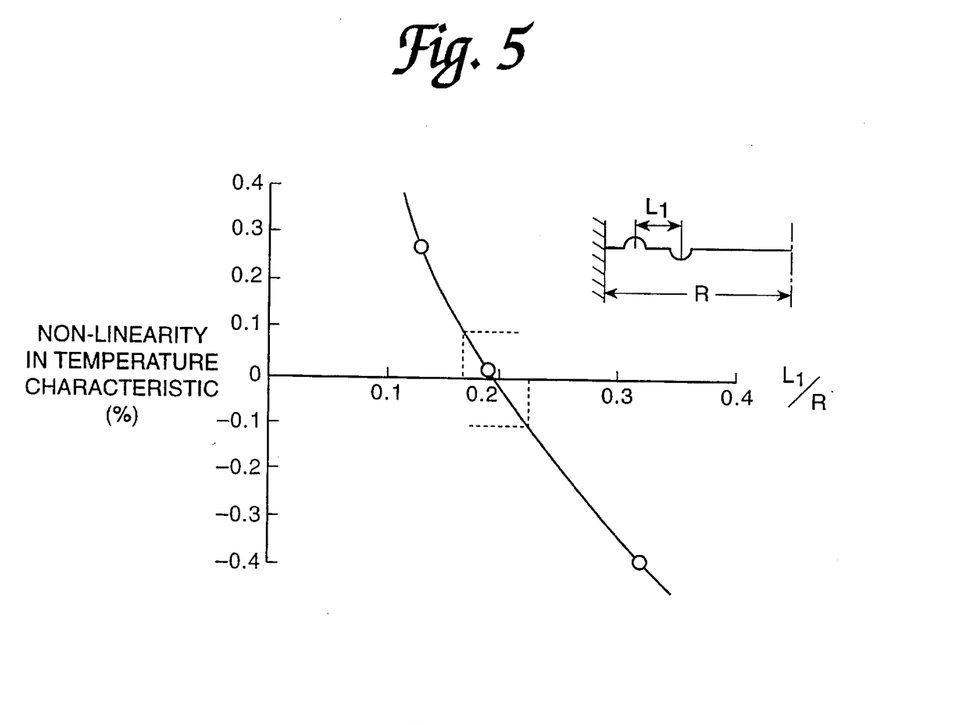
FIG. 5 is a graph illustrating a non-linear relationship of a temperature characteristic with respect to a ratio ($L_{1/R}$) of a distance $L_1$ between a convex and concave portions of the diaphragm and a radius R.

In this embodiment, in order to reduce non-linearity in the temperature characteristic of the pressure sensor, a simulation analysis, based on the finite element method, is carried out on the ratio ($L_{1/R}$) between a distance $L_1$ between the convex and concave portions 2a and 2b and the radius R. FIG. 5 shows the result as a graph of a non-linearity (%) in the temperature characteristic of the output value of the pressure sensor with respect to the ratio ($L_{1/R}$). Here, the non-linearity in the temperature means, in the graph showing a change in the output value of the pressure detecting sensor 4 upon a change in the temperature, a ratio (%) of a width of a bent portion of the graph to the maximum output value.

In order to obtain a value of the non-linearity of the temperature characteristic in the range between about 0.1% to about −0.1%, the value of the $L_{1/R}$ must be, from the graph in FIG. 5, set in a range between about 0.16 to about 0.24. Such a setting of the ratio ($L_{1/R}$) in the above range allows the non-linearity of the temperature characteristic in the output value to be effectively reduced.

Figure 8:
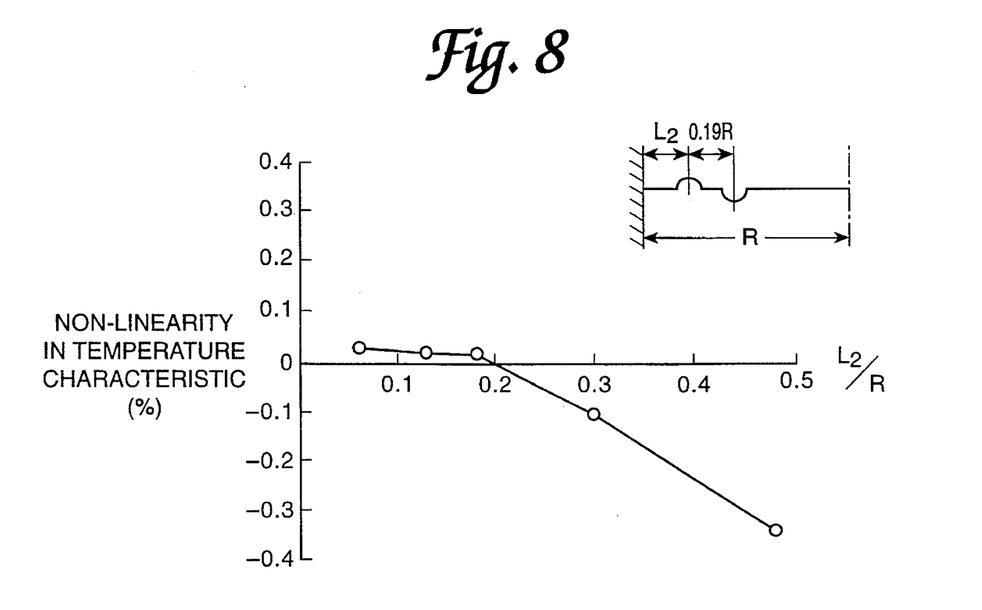
FIG. 8 is a graph illustrating the non-linearity of the temperature characteristic with respect to a ratio ($L_{2/R}$) between a distance $L_2$ from the fixed end to the convex portion of the diaphragm and a radius R.

Furthermore, according to the present invention, in order to reduce a thermal output (output value induced by a thermal effect) of the pressure detecting element 4 generated only by the expansion pressure of the liquid caused by a temperature increase, a simulation analysis based on the finite element method is carried as to a ratio between a distance $L_2$ from the convex portion 2a to the fixed end of the diaphragm 2 and the radius R of the diaphragm 2, so that a particular range as shown in FIG. 8 is set.

Namely, if a stress in the diaphragm 2, which occurs when an inner pressure varies, is concentrated at a location adjacent the fixed end of the diaphragm, it is desirable that a ratio $(L_{2/R})$ between the distance $L_2$ from the convex portion 2a to the fixed end of the diaphragm 2 and the radius R is such that, when the liquid in the pressure detection chamber 3 expands due to an increase in the ambient temperature, such an expansion of the liquid is absorbed by allowing the diaphragm 2 to expand outwardly, thereby maintaining the inside pressure to be as small as possible. Thus, in order to cause the volume of pressure detection chamber to be fully increased when the diaphragm 2 is expanded, it is required that the value of the ratio $(L_{2/R})$ is equal to or smaller than 0.16, as shown in FIG. 8. As a result, the corrugation in the diaphragm 2 should be located in a position adjacent to its fixed end, thereby reducing the increase in the output value of the pressure detecting element 4 when the inside pressure increases due to the increase in the ambient temperature.

Figure 6:
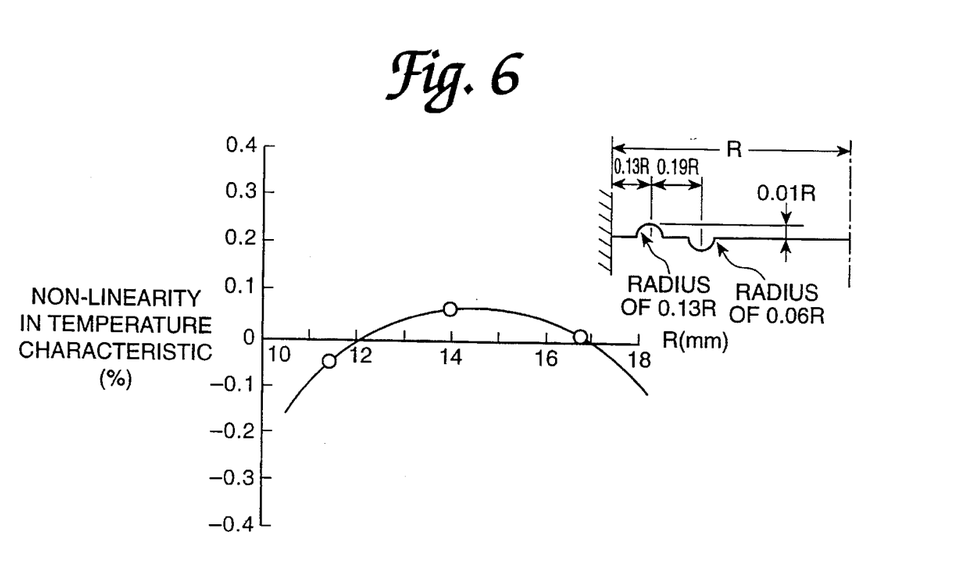
FIG. 6 is a graph illustrating the non-linearity of a temperature characteristic with respect to a radius R.

FIG. 6 is a graph which shows the non-linearity (%) of the temperature characteristic of the output value of the sensor with respect to the radius R when the latter is varied. In this case, the thickness T of the diaphragm is 0.0038×R, the height of the convex and concave portions 2a and 2b is 0.01×R, the distance $L_1$ between the convex and concave portions 2a and 2b is 0.19×R, the distance $L_2$ between the convex portion 2a and the fixed end of the diaphragm 2 is 0.13×R, and the radius of the arc shaped section of the corner of the convex and concave portions 2a and 2b is 0.06×R.

As shown in graph in FIG. 6, for all of the varied radii R of the diaphragm 2 as obtained, the non-linearity in the temperature characteristic is within a range between about 0.1% and about −0.2%. Thus, these dimensions can make it possible that a reduction of the radius R can ensure that the non-linearity in the temperature characteristic is within the desired minimum value, thereby reducing the size of the pressure sensor.

Furthermore, the flat portion 2d is arranged between the convex and concave portions 2a and 2b. Thus, when the diaphragm 2 is deformed, a large curvature of the convex and concave portions 2a and 2b allows the amount of the displacement of the diaphragm to be sufficiently large, thereby absorbing the change of the inside pressure generated in by the temperature change.

Figure 7:
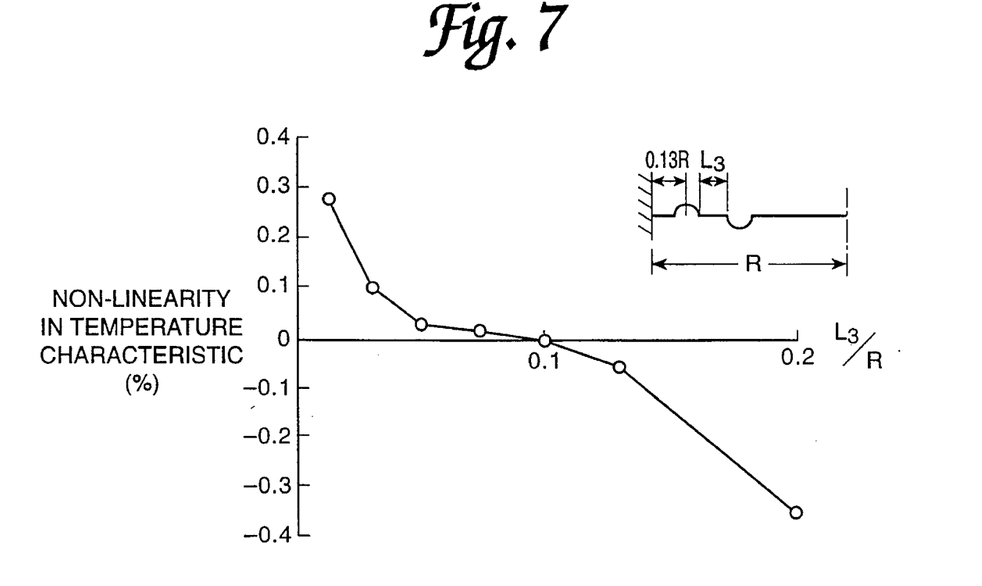
FIG. 7 is a graph illustrating the non-linearity of the temperature characteristic with respect to a ratio ($L_{3/R}$) between the flat portion $L_3$ and the radius R.

FIG. 7 is a graph illustrating a non-linearity (%) in the temperature characteristic in the sensor output value when the distance from the convex portion 2a to the fixed end of the diaphragm 2 is fixed at 0.13 R, and the ratio $(L_{3/R})$ of the distance $L_3$ of the flat portion 2d to the radius R of the diaphragm 2 is varied. As will be understood from this graph, in order to obtain substantially 0% non-linearity, the ratio $(L_{3/R})$ should be maintained in a range between 0.05 and 0.13. The reason is now explained. Namely, when the ratio $(L_{3/R})$ is too small, a change making the curvature of the convex portion 2a large during the deformation of the diaphragm 2 can prevent making the curvature of the concave portion 2b large, thereby the amount of the deformation of the diaphragm becomes small. Contrary to this, when the ratio $(L_{3/R})$ is too large, the concave portion 2b is arranged, relatively, at the center of the diaphragm, causing the force applied to the convex portion 2b to become small, so that the change in the inner pressure cannot be sufficiently absorbed.

The thus constructed semiconductor type pressure sensor is mounted on an internal combustion engine, such as a surge tank, using the screw thread portion of the periphery of the housing 8, so that the diaphragm 2 constructing the detecting surface projects into the inside to the surge tank, thereby making it possible to detect the pressure inside the surge tank.

When a pressure, of the fluid to be detected, is applied, the diaphragm 2 is subjected to a deformation, so that the pressure detecting element 4 is subjected to the pressure via the liquid in the pressure detecting chamber 3. In this case, the output voltage across the bridge circuit of the pressure detecting element 4 changes in accordance with the pressure, thereby providing an output signal with a varied value of voltage. As a result, a signal which is indicative of the pressure value is taken out via the amplifier circuit on the circuit board 11.

The temperature at a location of an internal combustion engine such as the surge tank is largely varied in accordance the operating condition of the engine. However, the provision of a corrugation constructed by a pair of convex and concave portions allows the diaphragm 2 to be evenly bent at its inner and outer sides when the pressure in the pressure detecting chamber 3 is changed to a positive or negative value, thereby obtaining a balanced deformation of the diaphragm 2.

Furthermore, as above mentioned, the value of the ratio $(L_{2/R})$ is set to be smaller than about 0.16, and the value of the ratio $(L_{3/R})$ is set to be a value in a range between 0.05 to 0.13. Thus, when the liquid in the pressure detecting chamber expands due to an increase in the temperature, a major part of the diaphragm 2 is deformed so that it is outwardly expanded, so that the volume of the pressure detecting chamber 3 is sufficiently increased. As a result, the change in the inner pressure due to the temperature difference is minimized, and the generation of the thermal output (thermal output value) by the pressure sensor can be minimized.

Furthermore, the setting of the desired range of the ratio $(L_{1/R})$ between about 0.16 and about 0.24 allows the non-linearity of the temperature characteristic of the detected output value to be maintained in a range between about 0.1% and about −0.1%, thereby allowing the detected data to be easily compensated in accordance with the temperature by using a temperature compensating circuit.

In addition, the present invention can be, in addition to the above embodiment, used in a pressure sensor of a relative pressure detecting type by providing a pressure reference chamber opening to the atmosphere and formed at the back of a pressure detecting element, as well as a differential pressure detecting type pressure sensor having diaphragms on the sides of the pressure detecting chamber.

[Applicability in Industries]

The present invention can be applied to a liquid confined semiconductor type pressure sensor where a semiconductor type pressure detecting element such as a piezo-electric type resistor element is confined in a liquid such as a silicone oil sealed by a metal diaphragm, and in particular useful when applied to a sensor for detecting a turbopressure in an internal combustion engine where the medium to be detected is at a relatively high temperature.

I claim:

1. A semiconductor type pressure sensor comprising a housing for providing therein a pressure detection chamber;

a pressure receiving diaphragm adjoining a liquid confined in said pressure detection chamber, and;

a pressure detection element arranged to receive the pressure of the liquid in the pressure detection chamber;

said diaphragm having, at a location adjacent its fixed end, only a pair of corrugations comprising a convex and concave portions, and a flat portion of a predetermined length arranged between said convex and concave portions.

2. A semiconductor type pressure sensor according to claim 1, wherein a ratio ($L_3/R$) between the predetermined length ($L_3$) and the radius (R) of the diaphragm is in a range between 0.05 and 0.13.

3. A semiconductor type pressure sensor according to claim 1, wherein a ratio ($L_2/R$) between a distance ($L_2$) from the fixed end to the corrugation adjacent the fixed end and the radius (R) of the diaphragm is in a range which is equal to or smaller than 0.16.

4. A semiconductor type pressure sensor according to claim 1, wherein said diaphragm is made from a metal plate.

5. A semiconductor type pressure sensor according to claim 1, wherein said liquid confined in the pressure detecting chamber is a silicone oil.

6. A semiconductor type pressure sensor according to claim 1, wherein both of said convex and concave portions are formed as a wave shape.

* * * * *